US012202458B2

(12) United States Patent
Hanslik et al.

(10) Patent No.: US 12,202,458 B2
(45) Date of Patent: Jan. 21, 2025

(54) METHOD AND APPARATUS FOR BRAKING A UTILITY VEHICLE WITH AN ELECTRIC DRIVE

(71) Applicant: ZF CV Systems Europe BV, Brussels (BE)

(72) Inventors: Daniel Hanslik, Isernhagen (DE); Johannes Heseding, Hannover (DE); Janik Ricke, Uetze (DE); Torsten Wallbaum, Duingen (DE)

(73) Assignee: ZF CV Systems Europe BV, Brussels (BE)

( * ) Notice: Subject to any disclaimer, the term of this patent is extended or adjusted under 35 U.S.C. 154(b) by 495 days.

(21) Appl. No.: 17/736,776

(22) Filed: May 4, 2022

(65) Prior Publication Data

US 2022/0258708 A1    Aug. 18, 2022

Related U.S. Application Data

(63) Continuation of application No. PCT/EP2020/081463, filed on Nov. 9, 2020.

(30) Foreign Application Priority Data

Nov. 8, 2019    (DE) .................... 10 2019 130 200.5

(51) Int. Cl.
*B60T 8/32*    (2006.01)
*B60T 7/20*    (2006.01)
*B60T 8/17*    (2006.01)

(52) U.S. Cl.
CPC ............ *B60T 8/323* (2013.01); *B60T 8/1708* (2013.01); *B60T 7/20* (2013.01)

(58) Field of Classification Search
CPC .......... B60T 8/708; B60T 8/246; B60T 8/248; B60T 8/323; B60T 1/10; B60T 7/12;
(Continued)

(56) References Cited

U.S. PATENT DOCUMENTS 6,516,925 B1 * 2/2003 Napier .................. B60T 8/1708
                                                            188/112 A
11,708,009 B2 * 7/2023 Lee ......................... G06F 17/18
                                                              180/65.1
(Continued)

FOREIGN PATENT DOCUMENTS

CN    107953872 A    4/2018
CN    108120606 A    6/2018
(Continued)

OTHER PUBLICATIONS

International Search Report of the European Patent Office dated Feb. 12, 2021 for international application PCT/EP2020/081463 on which this application is based.

(Continued)

*Primary Examiner* — Robert A. Siconolfi
*Assistant Examiner* — San M Aung
(74) *Attorney, Agent, or Firm* — Walter Ottesen, P.A.

(57) ABSTRACT

A method for a utility vehicle, in particular a towing vehicle or a vehicle combination with a utility vehicle, includes the following steps carried out with a control unit of the utility vehicle. A status message is received from an electric drive of the utility vehicle or a trailer vehicle towed by the utility vehicle, which indicates that a braking torque can be provided via the electric drive. An offer message, which indicates an offered braking torque, is then generated depending on the status message. Furthermore, the offer message is sent out to or for at least one further control unit of the utility vehicle. The disclosure includes a braking control unit and a braking system for carrying out the method and a utility vehicle or a vehicle combination with the braking control unit or the braking system. The disclosure includes a computer program product for carrying out the method.

20 Claims, 2 Drawing Sheets

(58) Field of Classification Search
CPC . B60T 7/18; B60T 7/20; B60T 13/662; B60T 13/586; B60T 2230/06; B60T 2270/613; B60L 7/10; B60L 3/0076; B60L 15/2009; B60L 2200/28; B60L 2200/36; B60L 2200/42; B60Y 2200/91
USPC .......................................................... 303/20
See application file for complete search history.

(56) References Cited

U.S. PATENT DOCUMENTS

| | | | |
|---|---|---|---|
| 2014/0316669 A1* | 10/2014 | Rudberg | B60T 13/586 |
| | | | 701/70 |
| 2015/0060160 A1 | 3/2015 | Kerschl et al. | |
| 2019/0009760 A1* | 1/2019 | Zenner | B60T 8/323 |
| 2019/0202429 A1* | 7/2019 | Richter | B60K 17/354 |
| 2021/0162965 A1 | 6/2021 | Mellings et al. | |
| 2021/0370898 A1 | 12/2021 | Eckert | |

FOREIGN PATENT DOCUMENTS

| | | |
|---|---|---|
| CN | 109501787 A | 3/2019 |
| CN | 109789859 A | 5/2019 |
| DE | 10 2013 014 305 A1 | 3/2015 |
| DE | 10 2016 003 356 A1 | 9/2017 |
| DE | 10 2016 204 090 A1 | 9/2017 |
| EP | 1 234 739 A2 | 8/2002 |
| GB | 2565851 A | 2/2019 |
| WO | 2013/066242 A1 | 5/2013 |

OTHER PUBLICATIONS

Translation of the Written Opinion of the International Searching Authority dated Feb. 12, 2021 for international application PCT/EP2020/081463 on which this application is based.

* cited by examiner

METHOD AND APPARATUS FOR BRAKING A UTILITY VEHICLE WITH AN ELECTRIC DRIVE

CROSS REFERENCE TO RELATED APPLICATIONS

This application is a continuation application of international patent application PCT/EP2020/081463, filed Nov. 9, 2020 designating the United States and claiming priority from German application 10 2019 130 200.5, filed Nov. 8, 2019, and the entire content of both applications is incorporated herein by reference.

TECHNICAL FIELD

The disclosure relates to the sector of utility vehicles and in particular the braking of a utility vehicle via an electric drive.

BACKGROUND

Utility vehicles which, in addition to a combustion engine as the primary drive source, also have an electric drive to support the combustion engine, are known. The electric drives are used in utility vehicles, for example, to be able to operate the combustion engine in an energy-efficient speed range or to provide additional thrust, for example when starting off or driving uphill. In addition, kinetic and potential energy of the vehicle can be recovered with electric drives and stored as electrical energy in an energy storage system of the electric drive. This makes it possible to brake the utility vehicle.

It is also known that for utility vehicles, a trailer vehicle, also known as a trailer for short, may also be equipped with an electric drive in order to provide an additional driving force for the utility vehicle through the trailer, for example during an uphill drive. In this case, the utility vehicle towing the trailer is also referred to as a towing vehicle. In the case of a trailer with an electric drive, it is possible to use the electric drive to recover kinetic and potential energy from the trailer and the towing vehicle itself and to store it as electrical energy in the energy storage system of the electric drive.

In accordance with the prior art, in a combination of a towing vehicle and a trailer vehicle, an electronic braking system (EBS) of the towing vehicle actuates the friction brakes of the towing vehicle and an electronic trailer braking system (TEBS) actuates the friction brakes of the trailer vehicle in the event of a desired braking torque. Typically, a braking control unit of the electronic braking system sends a signal to a trailer braking control unit of the electronic trailer braking system to trigger the friction brakes of the trailer vehicle. This procedure is valid according to the prior art for normal service braking regardless of the presence of an electric drive.

If one of the two vehicles of the combination vehicle, that is, either the towing vehicle or the trailer vehicle, is equipped with an electric drive, it has turned out that this can be advantageously controlled by the corresponding braking control unit or the trailer braking control unit. In particular, it is exploited here that already according to the prior art not only a braking request, but also an acceleration request of a driver is fed to the braking control unit and thus the electric drive can be correspondingly incorporated in the desired positive or negative acceleration by the braking control unit or trailer braking control unit.

According to the prior art, towing vehicles often also have a wear-free permanent brake, which is also known as a retarder and which is usually integrated into the rear axle or rear axles of the towing vehicle.

When there is a braking request, the permanent brake is preferably incorporated into the brake control of the electronic braking system in order to reduce the brake wear of the friction brakes. Thus, a very large proportion of normal adaptive braking, for example in the case of essentially continuous convoys on the motorway or when driving on a route with a slope, can be achieved solely via the permanent brakes.

The permanent brake can also be controlled via an additional control unit upstream of the braking control unit. If only the permanent brakes are active, in such a case no braking request is transferred to the braking control unit and optionally the trailer braking control unit.

In particular, in the latter case, the control of conventional wear-free permanent brakes is not carried out via the electronic braking system of the towing vehicle, but is directly controlled, for example, by driver assistance systems, such as an automatic distance control system. Accordingly, if a braking request is made by a driver assistance system, this is first transmitted to the retarder and only if the retarder cannot sufficiently fulfill this braking request, an additional braking request is transmitted from the driver assistance system to the electronic braking system to activate the friction brakes.

If the towing vehicle or trailer vehicle is equipped with an electric drive, the additional braking request transmitted from the driver assistance system to the electronic braking system may be passed on to the electric drive in order to produce an additional braking effect and thus further reduce the wear of the friction brakes.

This type of control of the brakes allows a reduction of the wear of the friction brakes and at the same time the recovery of electrical energy for the electric drive. The recovery of electrical energy with an electric drive to support the brakes or to generate a braking torque, which is also referred to as a braking moment, is also referred to as recuperation.

SUMMARY

An object of the present disclosure is to provide an alternative to the previous control of the brakes. Here, the disclosure is based on the knowledge that, according to the prior art, situations in which electrical energy can be recovered only occur when first a retarder is first fully actuated and thus not all possible braking energy is recovered as electrical energy. A further object of the present disclosure is therefore to optimize the recovery of electrical energy during the braking of a utility vehicle or a combination vehicle with an electric drive or to incorporate the electric drive into a braking operation in such a way that electrical energy is recovered during braking from the kinetic and potential energy of the towing vehicle or combination vehicle in an optimized manner.

For this purpose, the disclosure relates to a method for braking a utility vehicle, in particular a towing vehicle. The method can, for example, include the following steps, which are carried out with a control unit of the utility vehicle. The control unit of the utility vehicle can preferably be a braking control unit, in particular of an electronic braking system of the utility vehicle.

First, a status message is received by the control unit. The status message is received from an electric drive of the utility vehicle or a trailer vehicle towed by the utility vehicle. The status message indicates that a deliverable braking torque can be provided with the electric drive. The term "moment" or "torque" here always refers to a value. Thus, if a moment or torque is described in such a way that it is smaller or greater than another moment or torque, this always refers to the corresponding values of the moment or torque. The term "moment" is therefore used synonymously for the term "moment value" and the term "torque" is used synonymously for the term "torque value".

Preferably, a value for a torque corresponding to a deliverable braking torque which can be provided by the electric drive, in particular due to the prevailing operating conditions, can be derived from the status message. This value can either be derived from the status message by taking into account other parameters or can be extracted directly from the status message itself.

Here, the disclosure is based on the further knowledge that the braking torque which can be provided is not constant. Rather, the braking torque which can be provided depends, for example, on the state of charge of an energy storage system of the electric drive. A lower braking torque can therefore be provided with the electric drive in the case in which the energy storage system is almost completely charged, since in this case the energy gained during recuperation can no longer be stored or will soon no longer be stored. In addition, the braking torque which can be provided depends, for example, on the current revolution rate of the electric motor(s) of the electric drive, since a torque which can be output with an electric motor decreases with increasing revolution rate.

After receiving the status message, an offer message which indicates an offered braking torque is also generated with the control unit depending on the status message. Preferably, the offer message can contain a value for a braking torque which can be provided by the electric drive, which corresponds exactly to the value contained in the status message. The offered braking torque therefore preferably corresponds to the available braking torque. If the status message according to an alternative includes a state, state variables, state parameters and/or state values of the electric drive, such as revolution rate, energy storage charge, temperature and/or other data from which a deployable braking torque can be derived, then preferably a value for the braking torque which can be provided is preferably derived or calculated from the provided state for generating the offer message.

The offer message is then sent out, in particular via a bus of the towing vehicle, to at least one further control unit, in particular of a driver assistance system.

According to the disclosure, it is thus provided that the control unit, in particular the braking control unit, which is able to control the electric drive directly or indirectly, communicates the braking torque of the electric drive which can be provided or indicates it to at least one further control unit, for example of a driver assistance system. Thus, the further control unit according to the disclosure is enabled to recognize on the basis of the offer message that a braking torque can also be provided with the electric drive. The further control unit is thus enabled to request the electric drive, preferably before the request of a braking torque by a retarder, which can also be referred to as a retarder braking torque for short.

The possible preferred control of the electric drive provided by the disclosure for providing a permanent braking functionality in the form of a braking torque before the control of a retarder thus leads to a more frequent use of the electric drive in the recuperation mode and thus to an increase in the frequency of situations in which electrical energy is recovered.

At the same time, the fact that the offer message is always generated depending on the status message means that the further control unit always knows the currently available braking torque of the electric drive. Thus, in the event of a low or unavailable braking torque, safe braking can still be made possible by the electric drive, since the further control unit is also then put in a position to, as usual, first control the retarder and, if necessary, also the friction brakes via the braking control unit.

According to a first embodiment, the status message is received via a first bus connected to the control unit. The first bus can preferably be an ISO 11992-2 bus. The control unit can preferably be a braking control unit. The offer message is sent out according to this embodiment on a second bus, which is also connected to the control unit. The second bus is different from the first bus, that is, a different bus. The second bus is preferably a towing vehicle bus, with which in particular an SAE J1939 protocol is transmitted. Accordingly, the offer message is an SAE J1939 message.

Thus, with the control unit, in particular the braking control unit, information which was previously provided only on the first bus can advantageously be provided on the second bus, which is preferably connected to the further control unit as well as to the control unit. Thus, the further control unit, in particular by using bus systems already available in conventional vehicle configurations, is easily enabled to react to this information from the electric drive, that is, to initiate a recuperation mode as a priority if necessary.

According to a further embodiment, the method includes the following further steps, which are carried out with the control unit, preferably the braking control unit. First, a request message is received from the further control unit, with which a braking torque is requested, which is also called the requested braking torque below to differentiate it. The request message thus contains a value of a torque which corresponds to a requested braking torque or a value of a torque for a requested braking torque can be derived from the request message. Furthermore, a control message for controlling the electric drive is generated in order to generate a braking torque with the electric drive via the control. In this case, the control message is generated depending on the request message. The braking torque to be generated with the electric drive is therefore dependent on the braking torque requested by the request message or preferably corresponds to it. Finally, the control message is sent to the electric drive. The sending of the control message includes either direct sending of the control message to the electric drive or indirect sending to the electric drive via a control unit, such as another braking control unit or a trailer braking control unit.

A braking torque can thus easily be requested by the further control unit, for example by the driver assistance system, with the request message, which is then received by the control unit, preferably the braking control unit, and converted into a control signal for the electric drive or transferred to it to generate a braking torque with the electric drive. The further control unit, such as the driver assistance system, can therefore call up a braking torque by the electric drive without it having to be directly connected to the electric drive. This call-up with a request message is particularly easy to realize, since a comparable request message is already implemented in known other control units, for example of driver assistance systems, for the usual control of a retarder. Calling up a braking torque with the electric drive can therefore be controlled in the same, simple way as a retarder.

According to a further embodiment, in the event of the triggering of a safety system detected by the control unit, an offer message is generated and sent by the control unit, which indicates an offered braking torque corresponding to a zero value. Examples of such a safety system include, in particular, all or some functions of a vehicle dynamics control system (ESP or ESC), such as an anti-lock braking system (ABS), an electronic braking system (EBS) or a roll stability control system (RSC).

This means that no braking torque is called up from the electric drive, even if the status message indicates that a braking torque can be provided. Furthermore, the further control unit is signaled that the electric drive is currently not available for a braking torque, so that the further control unit can request a braking torque that is still required, for example from the retarder. In any case, the further control unit can react to the fact that the electric drive is not available when a safety system is triggered.

Alternatively or additionally, in the event of the detected triggering of a safety system, a control message is generated by the control unit, in particular the braking control unit, in order to control the electric drive not to generate a braking torque regardless of the request message.

In the case of the triggering of a safety system, this is to be evaluated as a priority and it will be ensured according to this embodiment that braking by the electric drive does not impair the function of the safety system.

According to a further embodiment, a desired service braking torque is received or generated by the further control unit. For example, if the further control unit is the control unit of a driver assistance system, the desired braking torque is generated by the driver assistance system itself, for example if the distance to a vehicle in front is too short. Alternatively, it is also possible that the further control unit receives a desired service braking torque from another system of the vehicle, in particular another driver assistance system.

Depending on this desired service braking torque, the following steps are then carried out by the further control unit.

In the case in which the desired service braking torque is less than or equal to the braking torque offered by the offer message, a request message is generated and sent out by the further control unit which corresponds to the received desired service braking torque. This applies in particular in the case in which the utility vehicle has a retarder and in the case in which the utility vehicle does not have a retarder.

As long as the desired service braking torque can be fulfilled by the electric drive alone, a corresponding braking torque is requested from the electric drive with the request message and the control message.

On the other hand, in the case in which the desired service braking torque is greater than the braking torque offered via the offer message, the control unit generates a request message which corresponds to the offered braking torque. This means that the maximum braking torque offered by the electric drive is requested. Furthermore, in this case, the further control unit generates and sends another message to the braking control unit, with which an additional braking torque is requested, in particular to control the friction brakes. The further message here includes the requirement for a further braking torque which corresponds to the difference between the desired service braking torque and the offered braking torque. This case applies in particular in the case in which the utility vehicle does not have a retarder.

Thus, in this latter case, the maximum offered braking torque is first requested by the electric drive and additionally a braking torque is requested by the braking control unit which is to be realized by the friction brake in order to meet the entire desired service braking torque.

In the further case to be distinguished, wherein the towing vehicle has a retarder, and the desired service braking torque is greater than the braking torque offered via the offer message, a request message is generated and sent out by the further control unit which corresponds to the offered braking torque. Furthermore, a distinction is then made between the two further cases.

In the case in which the difference between the desired service braking torque and the offered braking torque is less than or equal to a retarder braking torque which can be provided by the retarder, then only in addition to the request message another message is sent from the further control unit to the retarder, with which a retarder braking torque which corresponds to the difference is requested from the retarder.

In the alternative case in which the difference between the desired service braking torque and the offered braking torque is greater than a retarder torque which can be provided by the retarder, in addition to the request message, a first further message is sent to the retarder by the further control device, with which a retarder braking torque is requested from the retarder, which corresponds to the retarder braking torque which can be provided. In addition, the further control unit generates a second further message to the braking control unit and sends it to the braking control unit, with which an additional braking torque, in particular by the friction brakes, is requested from the braking control unit, which corresponds to a further difference between the desired service braking torque and the sum of the offered braking torque and the maximum retarder braking torque which can be provided by the retarder.

In summary, the further control unit thus first controls the electric drive via the offer message. If the braking torque of the electric drive is sufficient to meet the desired service braking torque, this control remains the same. However, if the desired service braking torque cannot be achieved by the electric drive alone, additional braking torque is requested via the braking control unit and the friction brakes, in particular if the utility vehicle does not have a retarder.

However, in the case in which the utility vehicle has a retarder and the desired service braking torque cannot be applied with the electric drive alone, the retarder of the towing vehicle is first used and a braking torque is generated with the retarder, which can also be called retarder braking torque. If the retarder and the electric drive together cannot meet or realize the desired service braking torque, then in addition to the electric drive and the retarder a braking torque from the friction brakes is then requested by the further control via the braking control unit.

In this chain of requested braking torques in the event of service braking, that is, during normal braking while driving, for example adaptation braking, the electric drive is always used as a priority, so that essentially electrical energy is generated in every braking situation. The particularly efficient use of the electric drive when braking the utility vehicle is thus possible.

According to a further embodiment, in the event of a desired emergency braking torque received or generated by the further control unit, that is, in an emergency braking case, in particular by triggering emergency braking, the further control unit does not send out a request message or sends out a request message with a braking torque corresponding to a zero value. On the other hand, the desired emergency braking torque is preferably requested directly from at least one friction brake of the towing vehicle and/or the vehicle combination with a further message to the braking control unit.

Accordingly, in the event of a desired emergency braking, the further control unit ensures that an emergency braking torque must be generated instantaneously, that is, if possible without unavoidable delay, and that only the friction brakes of the service brake are used to meet this requirement. It should be taken into account that comparatively longer reaction times are to be expected when braking with the electric drive than with the friction brakes, in particular due to communication with and reaction by the electric drive.

According to a further embodiment, the electric drive is part of a trailer vehicle. The method then includes receiving the status message and sending out the control message via a bus connection, in particular the first bus. The bus connection, namely in particular the first bus, is established between the utility vehicle and the trailer vehicle.

In particular, according to this embodiment, the status message is received from a trailer braking control unit by the control unit configured as a braking control unit and the control message is received by the trailer braking control unit from the braking control unit. The electric drive is preferably controlled by the trailer braking control unit depending on the control message.

In an advantageous manner, if the electric drive is part of a trailer vehicle, the electric drive is controlled by the trailer braking control unit. The status of the electric drive received by the trailer braking control unit from the electric drive is also transmitted by the trailer braking control unit to the braking control unit of the utility vehicle in the form of a towing vehicle.

According to the prior art, there is a data connection in the form of an ISO11992 bus between the braking control unit and the trailer control unit of a combination vehicle consisting of a towing vehicle and trailer vehicle. According to the disclosure, this data connection is used directly to control the electric drive from the towing vehicle or to provide the status for the towing vehicle.

Furthermore, the disclosure relates to a braking control unit which is set up to carry out the method according to one of the aforementioned embodiments.

Here, the braking control unit according to a first embodiment includes a first interface for connecting to a first bus, which in particular can be connected to an electric drive or a trailer braking control unit. The first interface is used to receive a status message from the electric drive. Accordingly, the status message can be received directly from the electric drive or received via the trailer braking control unit, which preferably receives the status message from the electric drive. The status message indicates that a braking torque can be provided with the electric drive.

Furthermore, the braking control unit includes a computer unit for generating an offer message which indicates an offered braking torque, wherein the offer message is generated depending on the status message.

In addition, the braking control unit includes a second interface for connecting to a second bus, which can be connected in particular to a further control unit, in particular of a driver assistance system. The second interface is used to send out the offer message to the at least one further control unit.

In addition, the disclosure includes a braking system with the aforementioned braking control unit and a further control unit, in particular of a driver assistance system, for carrying out a method according to one of the aforementioned embodiments. The braking system is set up to send out a request message from the further control unit and to receive it with the braking control unit via the second interface.

According to an embodiment of the braking system, the braking system includes a trailer braking control unit and preferably an electric drive. The trailer braking control unit is set up to receive a status message from the electric drive of a trailer vehicle and to send it to the braking control unit. Furthermore, the trailer braking control unit is set up to receive a control message from the braking control unit and to forward it to the electric drive or to control the electric drive depending on the control message.

According to a further embodiment of the braking system, the braking control unit is connected to the further control unit via a second bus, in particular a towing vehicle bus. The second bus is set up to transmit messages using the SAE J1939 protocol.

According to a further embodiment of the braking system, the braking control unit is connected to the trailer braking control unit via a first bus, which is in particular an ISO 11992-2 bus with an ISO 7638 interface.

Furthermore, the disclosure includes a utility vehicle with a braking control unit according to one of the aforementioned embodiments or a braking system according to one of the aforementioned embodiments, wherein the utility vehicle further preferably has a retarder.

Furthermore, the disclosure includes a combination vehicle with the aforementioned utility vehicle according to the disclosure and a trailer vehicle according to the disclosure.

In addition, the disclosure includes a computer program product including instructions which, if they are carried out on at least one computer unit or a braking control unit, in particular according to one of the aforementioned embodiments, cause the computer unit or the braking control unit to carry out the steps of the method according to one of the aforementioned embodiments. Alternatively or additionally, the computer program includes instructions which, if they are carried out on a braking control unit and a further control unit of a braking system according to one of the aforementioned embodiments, carry out the steps of the method according to one of the aforementioned embodiments.

BRIEF DESCRIPTION OF THE DRAWINGS

The invention will now be described with reference to the drawings wherein.

DESCRIPTION OF THE PREFERRED EMBODIMENTS

Figure 1:
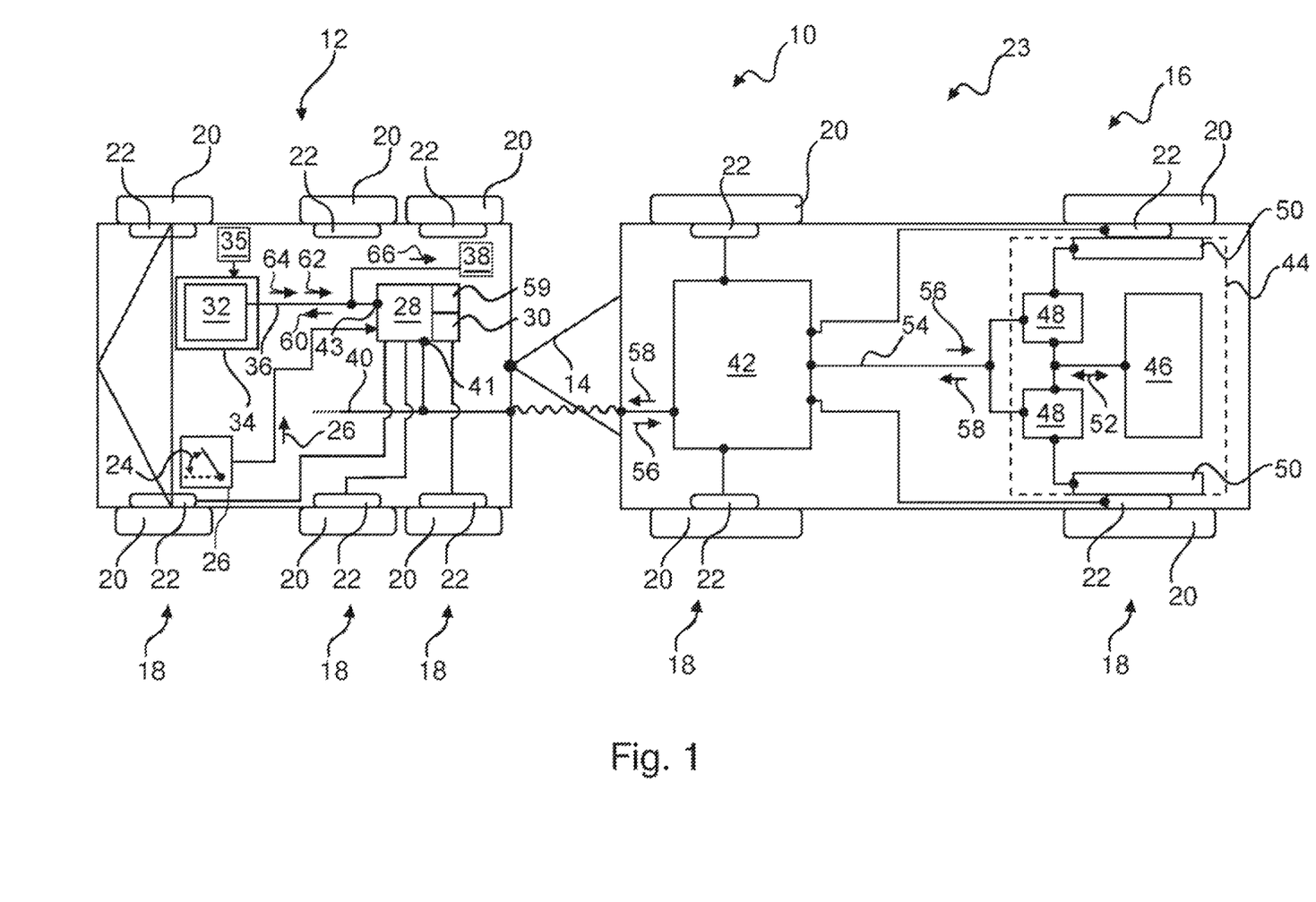
FIG. 1 shows a combination vehicle including a towing vehicle and a trailer vehicle; and, FIG. 2 shows the steps of the method according to an embodiment.

FIG. 1 shows a combination vehicle 10, which has a utility vehicle 12. The utility vehicle 12 is a towing vehicle 12 here, as it is connected to a trailer vehicle 16 via a drawbar 14. The trailer vehicle 16 can thus be towed by the towing vehicle 12.

The towing vehicle 12 and the trailer vehicle 16 each include multiple axles 18, each with two wheels 20. At least one of the axles 18 is driven by a combustion engine or an electric drive, wherein neither an internal combustion engine nor an electric drive of the towing vehicle 12 is shown in FIG. 1 for the sake of a better overview. Furthermore, each of the wheels 20 is configured with a friction brake 22 for wheel-specific braking of the wheels 20. Furthermore, the combination vehicle 10 includes a braking system 23. For braking, that is, to slow down the vehicle, which is also referred to as deceleration, the utility vehicle 12 has a brake pedal 24, with which an operator of the towing vehicle 12 signals a braking request 26 to a control unit 28 of an electronic braking system (EBS) by varying a position of the brake pedal 24. The control unit 28 is a braking control unit 28 here, which includes at least one safety system 30, which is a driving dynamics control system 30 here. The brake pedal 24 is connected to the braking control unit 28 via a signal line. The braking control unit 28 is used to control the friction brakes 22, which are arranged on the individual wheels 20, depending on the braking request.

Furthermore, the braking control unit 28 and a further control unit 32 of a driver assistance system 34 are connected. The connection is formed by a towing vehicle bus 36, via which messages can be exchanged with an SAE J1939 protocol between the further control unit 32 and the braking control unit 28. For example, in the event that the driver assistance system is or includes an automatic distance control system, the further control unit 32 may cause the braking control unit 28 to activate the friction brakes 22 for deceleration. For this purpose, the further control unit 32 generates a service braking torque. It may also be provided that the further control unit 32 is connected to further driver assistance systems 35 and receives a service braking torque from these further driver assistance systems 35 and forwards it to the braking control unit 28.

The towing vehicle bus 36 is also connected to a retarder 38, which can also be controlled by the further control unit 32 in order to generate a permanent braking effect if this is desired by the driver assistance system 34. Thus, the load on the friction brakes 22 can be reduced.

In addition, the braking control unit is connected to an ISO 11992-2 bus 40, which is further connected to a trailer braking control unit 42. The trailer braking control unit 42 is part of the trailer vehicle 16 and is used to control friction brakes 22 of the trailer vehicle 16. The ISO 11992-2 bus 40 corresponds to a first bus 40, to which the braking control unit 28 is connected with a first interface 41. Accordingly, the towing vehicle bus 36 corresponds to a second bus 36, to which the braking control unit 28 is connected via a second interface 43.

Furthermore, the trailer braking control unit 42 is used to control an electric drive 44 of the trailer vehicle 16. The electric drive 44 includes an energy storage system 46, which is rechargeable and can also be referred to as an accumulator. In addition to the energy storage system 46, the electric drive 44 includes two converters 48, which supply electric motors 50 with the energy of the energy storage system 46 to generate a positive torque. The electric motors 50 can also be operated in generator mode or as generators, so that electrical energy 52 is fed back into the energy storage system 46 via the converters 48. According to another embodiment not shown here, the electric drive 44 includes only one electric motor 50, which drives two wheels via a differential gear. Also in such an embodiment, the motor can be operated as a generator to feed electrical energy 52 via an inverter 48 into the energy storage system 46.

The electric drive 44 is connected to the trailer braking control unit 42 via a bus 54 to receive a control message 56 from the trailer braking control unit 42 on the one hand and to send a status message 58 to the trailer braking control unit 42. Via the control message 56, the trailer braking control unit can control the electric drive 44, in particular the converters 48, in such a way that the electric motors 50 are operated in generator mode and generate a braking torque.

To carry out the method, the braking control unit 28 additionally includes a computer unit 59. The braking control unit is set up according to the disclosure to receive a status message 58 about the status of the electric drive, in particular the charge of the energy storage system 46 or the revolution rate of the electric motors 50, from the electric drive 44 via the trailer braking control unit 42, and to provide an offer message 60 on the second bus 36 for an offered braking torque depending on the status message 58. The further control unit 32 can then send a request message 62 for a requested braking torque to the braking control unit 28, with which it requests a braking torque. Depending on this request message 62, the braking control unit then generates a control message 56. Furthermore, the further control unit 32 can send out further messages 64, 66 for controlling the friction brakes 22 via the braking control unit and for controlling a retarder 38.

Figure 2:
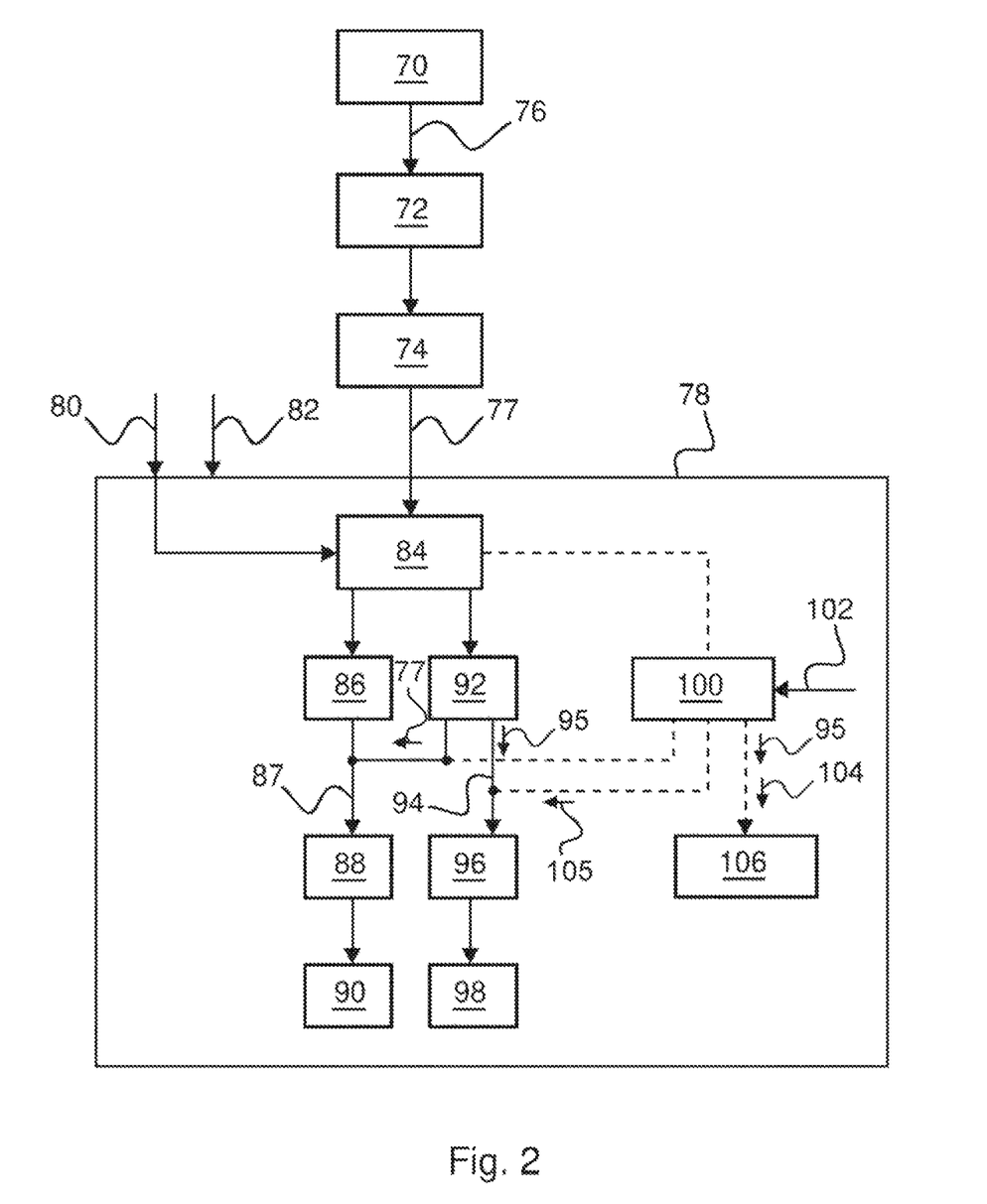

The steps of the method are shown in detail in FIG. 2 according to an embodiment. In a step 70, a status message 58 is received by a braking control unit 28 from an electric drive 44, either directly or via a trailer braking control unit 42. The status message indicates a braking torque 76 which can be provided. In a step 72, an offer message 60 is generated from the status message 58. In a step 74, the offer message 60, which indicates an offered braking torque 77, is sent out.

In a step 78, the offer message 60 is received by a further control unit 32 and at least one request message 62 is generated by the further control unit 32 depending on the offer message 60 and depending on a received or generated desired service braking torque 80 or depending on a received or generated emergency braking torque 82.

For this purpose, in step 78, if a desired service braking torque 80 and no desired emergency braking torque 82 is received, it is checked in a step 84 whether the desired service braking torque 80 is smaller, equal to or greater than the offered braking torque 77. In the case in which the desired service braking torque 80 is less than or equal to the offered braking torque 77, a request message 62 is generated in a step 86 containing a requested braking torque 87 corresponding to the desired service braking torque 80. In the step 88, the request message 62 is received by the braking control unit 28 and in a step 90 the electric drive 44 is controlled with this requested braking torque 87 in the form of a control message 56.

If, on the other hand, the desired service braking torque 80 is greater than the offered braking torque, a request message 62, which contains a requested braking torque 87 which corresponds to the offered braking torque 77, is generated and sent out in step 92 by the further control unit 32. Consequently, steps 88 and 90 are carried out again.

At the same time, in step 92, another message 64 is generated and also sent to the braking control unit 28 to generate an additional braking torque 94, which can also be referred to as a friction braking torque 94. The additional braking torque 94 corresponds to a difference 95 between the desired service braking torque 80 and the offered braking torque 77. The requested friction braking torque 94 is received by the braking control unit 28 in step 96 and in step 98 the friction brakes 22 are controlled accordingly by the braking control unit 28.

Furthermore, FIG. 2 also shows the optional case in which the towing vehicle 12 additionally has a retarder 38. If the case occurs in which the desired service braking torque 80 is greater than the offered braking torque 77 and if a retarder 38 is present in the towing vehicle 12, then in a step 100 with the further control unit 32, analogous to step 92, a request message 62 is generated and sent out by the further control unit 32, which contains a requested braking torque 87 which corresponds to the offered braking torque 77. Consequently, steps 88 and 90 are again carried out.

At the same time, however, it is then further checked in step 100 whether the requested braking torque 87 alone can fulfil the desired service braking torque 80. If this is not the case, the difference 95 between the service braking torque 80 and the requested braking torque 87 is formed. Furthermore, in step 100 it is checked whether the difference 95 is less than or equal to a retarder braking torque 102 which can be provided by the retarder 38. If this is the case, a retarder braking torque 104 which corresponds to the difference 95 is sent out with a further message 66 and the retarder 38 is controlled with the requested retarder braking torque 104 in a step 106.

However, if the difference 95 is greater than the retarder braking torque 102 which can be provided by the retarder 38, a retarder braking torque 104 corresponding to the retarder braking torque 102 which can be provided is requested with a further message 66 and the retarder 38 is controlled with the requested retarder braking torque 104 in a step 106. In addition, analogous to step 92, a further message 64 is generated and sent to the braking control unit 28 to request an additional braking torque with the friction brakes 22 in order to provide the desired service braking torque 80. This additional braking torque corresponds to a further difference 105 between the desired service braking torque 80 and the sum of the offered braking torque 77 and the retarder braking torque 102 which can be provided.

In the case in which an emergency braking torque 82 is received or generated by the further control unit 32, a request message 62 is generated which does not request a braking torque because the friction brake is operated directly.

It is understood that the foregoing description is that of the preferred embodiments of the invention and that various changes and modifications may be made thereto without departing from the spirit and scope of the invention as defined in the appended claims.

REFERENCE CHARACTER LIST (PART OF THE DESCRIPTION)

10 Vehicle combination
12 Utility vehicle/towing vehicle
14 Drawbar
16 Trailer vehicle
18 Axle
20 Wheels
22 Wheel brake
23 Braking system
24 Brake pedal
26 Braking request
28 Control unit/braking control unit
30 Safety system/vehicle dynamics control
32 Further control unit
34 Driver assistance system
35 Further driver assistance systems
36 Towing vehicle bus/second bus
38 Retarder
40 ISO 11992-2 bus/first bus
41 First interface
42 Trailer braking control unit
43 Second interface
44 Electric drive
46 Energy storage system
48 Converters
50 Electric Motors
52 Electrical energy
54 Bus
56 Control message
58 Status message
59 Computer unit
60 Offer message
62 Request message
64 Further message
66 Further message
70 to 74 Steps of the method
76 Braking torque which can be provided
77 Offered braking torque
78 Step of the method
80 Service braking torque
82 Emergency braking torque
84 and 86 Steps of the method
87 Requested braking torque
88 to 92 Steps of the method
94 Additional braking torque/requested friction braking torque
95 Difference
96 and 98 Steps of the method
100 Step of the method
102 Retarder braking torque which can be provided
104 Retarder braking torque
105 Further difference
106 Step of the method

What is claimed is:

1. A method for a utility vehicle, the utility vehicle having a control unit and the method being carried out with the control unit of the vehicle and the method comprising the steps of:
receiving a status message from at least one of: an electric drive of the utility vehicle and a trailer vehicle towed by the utility vehicle indicating that a braking torque, which can be provided by the electric drive, is available;
generating an offer message with a computer unit indicating an offered braking torque from the electric drive, depending on the status message; and,
sending out the offer message to or for at least one further control unit of the utility vehicle.

2. The method of claim 1, wherein the status message is received via a first bus connected to the control unit and the offer message is sent out on a second bus connected to the control unit, wherein the offer message is sent out to or for the further control unit.

3. The method of claim 1, wherein the method includes the further steps carried out with the control unit of:
receiving a request message from the further control unit with which a requested braking torque is requested;
generating a control message to control the electric drive to generate the requested braking torque with the electric drive, wherein the generation of the control message takes place depending on the request message; and,
sending out the control message to the electric drive.

4. The method of claim 1, wherein in a triggering of a safety system detected by the control unit, at least one of the following applies:
   a) the offer message is generated and sent by the control unit indicating the offered braking torque corresponding to a zero value; and,
   b) the control unit generates and sends out a control message to control the electric drive to generate a requested braking torque with a zero value independently of a received request message.

5. The method of claim 1, wherein said control unit is a braking control unit and wherein the further control unit receives or generates a desired service braking torque; and, wherein the further control unit:
   a) in the case in which the desired service braking torque is less than or equal to the braking torque offered with the offer message, generates and transmits a request message corresponding to the desired service braking torque; or,
   b1) in the case in which the desired service braking torque is greater than or equal to the braking torque offered with the offer message, generates and sends out a request message corresponding to the offered braking torque, and the further control unit generates another message and sends the same to the braking control unit requesting an additional braking torque, which represents a difference between the desired service braking torque and the offered braking torque; or,
   b2) in the case in which the desired service braking torque is greater than the braking torque offered with the offer message and the utility vehicle has a retarder, generates and sends out a request message with the further control unit corresponding to the offered braking torque; and,
      i) in the case in which the difference between the desired service braking torque and the offered braking torque is less than or equal to a retarder braking torque which can be provided by the retarder, a further message is sent out from the further control unit to the retarder requesting a retarder braking torque from the retarder corresponding to the difference; or,
      ii) in the case in which the difference between the desired service braking torque and the offered braking torque is greater than the retarder braking torque which can be provided by the retarder, a further message is sent out from the further control unit to the retarder requesting a retarder braking torque from the retarder corresponding to the retarder braking torque and a further message is sent out from the further control unit to the braking control unit, with which an additional braking torque is requested, which corresponds to a further difference between the desired service braking torque and the retarder braking torque which can be provided.

6. The method of claim 1, wherein said control unit is a braking control unit and wherein, in the case of a desired emergency braking torque received or generated by the further control unit, the further control unit sends out no request message or a request message with a requested braking torque which corresponds to a zero value, and the further control unit sends out a further message to the braking control unit in order to request the emergency braking torque from at least one friction brake of the towing vehicle and a vehicle combination.

7. The method of claim 1, wherein said control unit is a braking control unit and wherein the electric drive is part of the trailer vehicle and the status message is received by the control unit in the form of a braking control unit via the first bus between the utility vehicle and the trailer vehicle, and the control message is sent out by the braking control unit, wherein the status message is sent out and the control message is received by a trailer braking control unit, and wherein the electric drive is controlled by the trailer braking control unit depending on the control message.

8. A braking control unit configured to carry out a method for a utility vehicle including the steps of:
   receiving a status message from at least one of: an electric drive of the utility vehicle and a trailer vehicle towed by the utility vehicle indicating that a braking torque, which can be provided by the electric drive, is available,
   generating an offer message with a computer unit indicating an offered braking torque from the electric drive, depending on the status message; and,
   sending out the offer message to or for at least one further control unit of the utility vehicle;
   the braking control unit comprising:
   a first interface for connecting to a first bus, which is connected to an electric drive or a trailer braking control unit, and for receiving a status message from the electric drive indicating that the braking torque which can be provided by the electric drive is available;
   the computer unit for generating the offer message which indicates the offered braking torque depending on the status message; and,
   a second interface for connecting to a second bus which is connected to the further control unit and for sending out the offer message to the at least one further control unit.

9. A braking system comprising:
   a braking control unit configured to carry out a method for a utility vehicle including the steps of:
   receiving a status message from at least one of: an electric drive of the utility vehicle and a trailer vehicle towed by the utility vehicle indicating that a braking torque, which can be provided by the electric drive, is available,
   generating an offer message with a computer unit indicating an offered braking torque from the electric drive, depending on the status message; and,
   sending out the offer message to or for at least one further control unit of the utility vehicle;
   the braking control unit including:
   a first interface for connecting to a first bus, which is connected to an electric drive or a trailer braking control unit, and for receiving a status message from the electric drive indicating that a braking torque which can be provided by the electric drive is available;
   a computer unit for generating the offer message which indicates the offered braking torque depending on the status message; and,
   a second interface for connecting to a second bus which is connected to the at least one further control unit and for sending out the offer message to the at least one further control unit.

10. The braking system of claim 9, further comprising a trailer braking control unit, wherein the trailer braking control unit is set up to receive a status message from an electric drive connected to the trailer braking control unit and to forward it to the braking control unit, and to receive a control message from the braking control unit and to control the electric drive depending on the control message.

11. The braking system of claim 9, wherein the braking control unit is connected to the further control unit via a second bus; and, the second bus is set up to transmit messages with or according to the SAE J1939 protocol.

12. The braking system of claim 10, wherein the braking control unit and the trailer braking control unit can be connected via a first bus.

13. A utility vehicle having the braking control unit as in claim 8, wherein the utility vehicle has a retarder.

14. A utility vehicle or combination of a utility vehicle and a trailer vehicle having the braking system as in claim 9, wherein said utility vehicle or the combination of the utility vehicle and the trailer vehicle has a retarder.

15. The method of claim 1, wherein the utility vehicle includes a towing vehicle or a combination of a towing vehicle and a trailer.

16. The braking control unit of claim 8, wherein the utility vehicle includes a towing vehicle or a combination of a towing vehicle and a trailer.

17. The braking system of claim 9, wherein the utility vehicle includes a towing vehicle or a combination of a towing vehicle and a trailer.

18. A computer program product configured to be carried out by at least one of a computer unit and a braking control unit, the computer program product comprising:
   a program code stored on a non-transitory computer readable medium, wherein said program code is configured, when executed by a processor of the at least one of the computer unit and the braking control unit, to:
   receive a status message from at least one of: an electric drive of a utility vehicle and a trailer vehicle towed by the utility vehicle indicating that a braking torque, which can be provided by the electric drive, is available,
   generate an offer message with the computer unit indicating an offered braking torque from the electric drive, depending on the status message; and,
   send out the offer message to or for at least one further control unit of the utility vehicle.

19. The computer program code of claim 18, further comprising:
   the computer program product code being carried out by a braking unit which includes a first interface for connecting to a first bus, which is connected to the electric drive or a trailer braking control unit, and for receiving the status message from the electric drive indicating that the braking torque which can be provided by the electric drive is available;
   the computer unit for generating the offer message which indicates the offered braking torque depending on the status message; and,
   a second interface for connecting to the second bus which is connected to the further control unit and for sending out the offer message to the at least one further control unit.

20. A computer program product configured to be carried out by at least one of a computer unit and a braking control unit of a braking system, the braking system having the braking control unit including a first interface for connecting to a first bus, which is connected to an electric drive or a trailer braking control unit, and for receiving a status message from the electric drive indicating that a braking torque which can be provided by the electric drive is available; the braking control unit further having the computer unit for generating an offer message which indicates an offered braking torque depending on the status message; and, the computer unit further having a second interface for connecting to a second bus which is connected to a further control unit and for sending out the offer message to the further control unit; the computer program product comprising:
   a program code stored on a non-transitory computer readable medium, wherein said program code is configured, when executed by a processor of the at least one of the computer unit and the brake control unit, to:
   receive a status message from at least one of: an electric drive of a utility vehicle and a trailer vehicle towed by the utility vehicle indicating that the braking torque, which can be provided by the electric drive, is available,
   generate an offer message with the computer unit indicating the offered braking torque from the electric drive, depending on the status message; and,
   send out the offer message to or for the further control unit of the utility vehicle.

* * * * *